(12) United States Patent
Everts et al.

(10) Patent No.: US 6,345,489 B1
(45) Date of Patent: Feb. 12, 2002

(54) WHEELED LAWN CARE UNIT

(75) Inventors: Robert G. Everts; Jeffrey M. Dils, both of Chandler; Kenneth M. Brazell, Phoenix; Raul F. Vidal, St. Gilbert, all of AZ (US)

(73) Assignee: MTD Southwest, Inc., Chandler, AZ (US)

( * ) Notice: Subject to any disclaimer, the term of this patent is extended or adjusted under 35 U.S.C. 154(b) by 0 days.

(21) Appl. No.: 09/510,820

(22) Filed: Feb. 23, 2000

(51) Int. Cl.[7] .............................................. A01D 34/08
(52) U.S. Cl. ...................... 56/12.7; 172/54.5; 172/245; 172/250
(58) Field of Search .............................. 172/13, 14, 15, 172/17, 18, 40, 41, 42, 43, 54.5, 245, 247, 250; 30/276, 296; 56/12.7, 17.5; 37/242, 244

(56) References Cited

U.S. PATENT DOCUMENTS

| | | | |
|---|---|---|---|
| 2,909,021 A | 10/1959 | McLane | |
| 2,930,176 A | 3/1960 | Lindel | |
| 2,934,875 A | 5/1960 | Katzfey | |
| 2,946,172 A | 7/1960 | Hale et al. | |
| 3,106,251 A | 10/1963 | Lucas | |
| 3,441,089 A | 4/1969 | Minton | |
| 4,122,601 A | * 10/1978 | Katsuya | 30/296 |
| 4,179,805 A | * 12/1979 | Yamada | 30/122 |
| 4,182,100 A | 1/1980 | Letter | |
| 4,389,836 A | 6/1983 | Lowry et al. | |
| 4,391,041 A | * 7/1983 | Porter-Bennett | 30/296 |
| 4,442,659 A | 4/1984 | Enbusk | |
| 4,505,040 A | * 3/1985 | Everts | 30/296 |
| 4,531,350 A | 7/1985 | Huthmacher | |
| 4,704,849 A | 11/1987 | Gilbert et al. | |
| 4,756,147 A | * 7/1988 | Savell | 56/16.7 |
| 4,879,869 A | 11/1989 | Buckendorf, Jr. | |
| 4,922,694 A | 5/1990 | Emoto | |
| 4,936,886 A | 6/1990 | Quillen | |
| 5,092,112 A | 3/1992 | Buckendorf, Jr. | |
| 5,222,750 A | 6/1993 | Ellis | |
| 5,263,303 A | 11/1993 | Stroud | |
| 5,279,102 A | 1/1994 | Foster | |
| 5,303,532 A | 4/1994 | Phillips | |
| 5,408,816 A | 4/1995 | Cartier | |
| D359,291 S | * 6/1995 | Tihonovich | D15/14 |
| 5,450,715 A | 9/1995 | Murray | |
| 5,603,205 A | 2/1997 | Foster | |
| 5,613,354 A | 3/1997 | Foster | |
| 5,626,006 A | 5/1997 | Fricke, Sr. | |
| 5,697,453 A | * 12/1997 | Van Den Bosch | 172/41 |
| 5,771,670 A | 6/1998 | Perry | |
| 5,802,724 A | * 9/1998 | Rickard | 30/296.1 |

(List continued on next page.)

Primary Examiner—Thomas B. Will
Assistant Examiner—Kristine Markovich
(74) Attorney, Agent, or Firm—Brooks & Kushman P.C.

(57) ABSTRACT

A compact, lightweight and easy-to-use wheeled lawn care unit comprising a two-wheeled carriage, a power source, plurality of tools which may be alternatively connected to the power source, a handle and a boom connecting the selected tool to the power source. The power source is pivotally connected to the carriage at a location within its footprint. The unit has a low center of gravity by placing the power source pivot and center of gravity within a cylinder defined by the wheels. The boom extends horizontally from the power source and is of a split boom configuration which allows selective rotation for the boom portions relative to one another. An edger can be selected for the unit, which includes a spring-loaded wheel. The edger may be rotated from a non-working position where the edger blade does not contact the ground to a working position by rocking a handle behind the carriage forward against the bias of the spring. A second more compact version has the shield positioned on the boom.

13 Claims, 9 Drawing Sheets

U.S. PATENT DOCUMENTS

| | | |
|---|---|---|
| 5,829,236 A | 11/1998 | Ballard et al. |
| 5,836,142 A | 11/1998 | Maxwell |
| 5,850,882 A * | 12/1998 | Link .......................... 172/41 |
| 5,884,462 A | 3/1999 | Gerber |
| 5,966,914 A | 10/1999 | Reents |
| 5,970,694 A | 10/1999 | Knox, Jr. |
| 6,003,611 A | 12/1999 | Martinez |
| 6,009,694 A | 1/2000 | Moore et al. |
| 6,062,318 A * | 5/2000 | Andrews .................... 172/15 |
| 6,065,275 A * | 5/2000 | Pope ......................... 56/12.7 |
| 6,085,503 A * | 7/2000 | Hutchinson ................ 56/12.7 |
| 6,213,677 B1 * | 4/2001 | Yamane et al. ............ 403/329 |

* cited by examiner

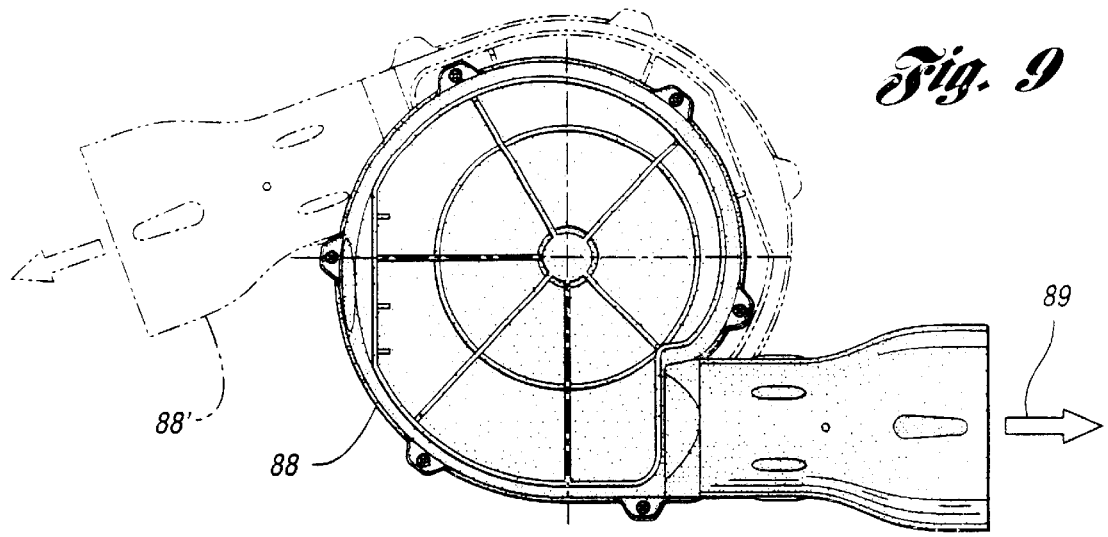
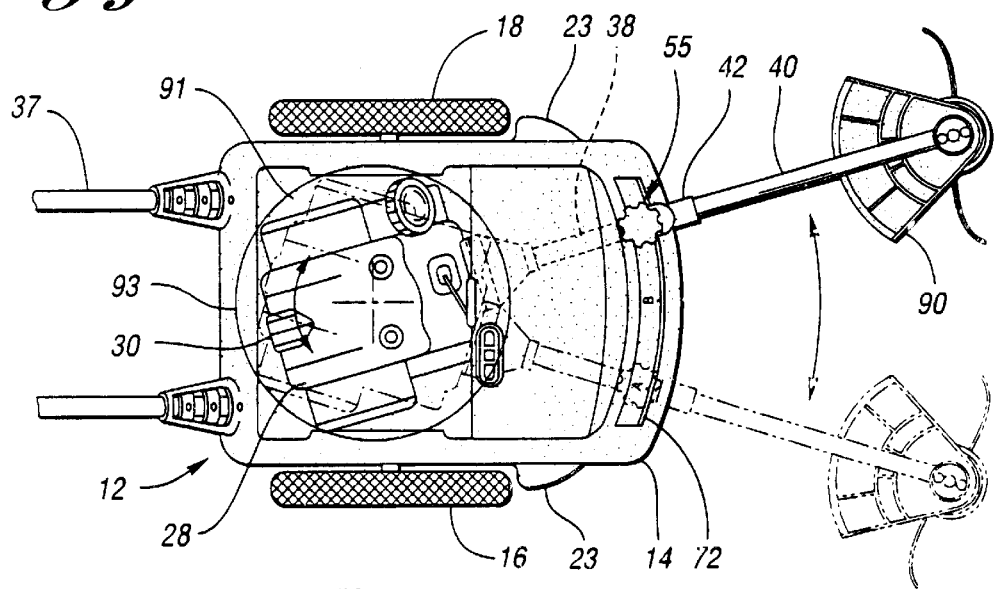
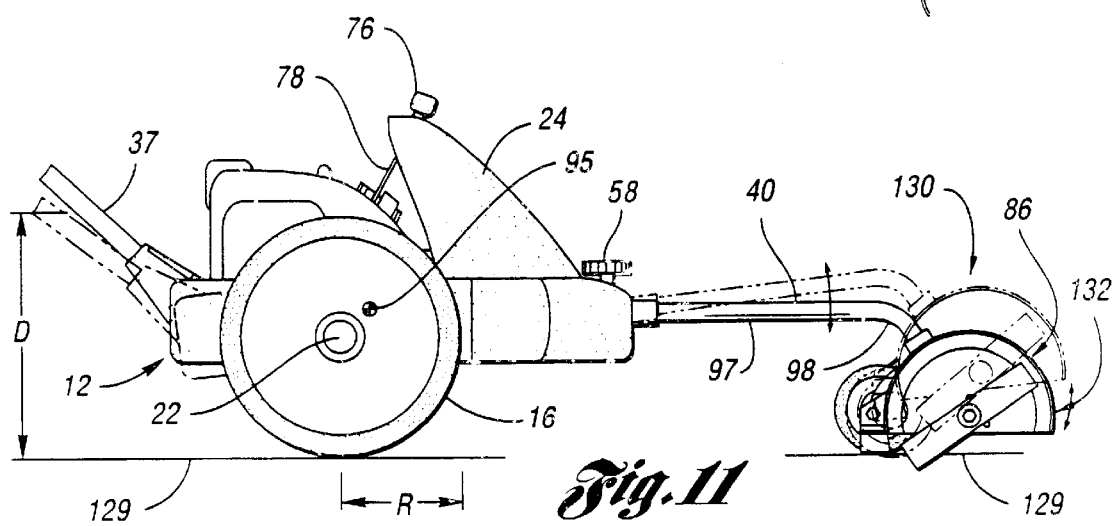

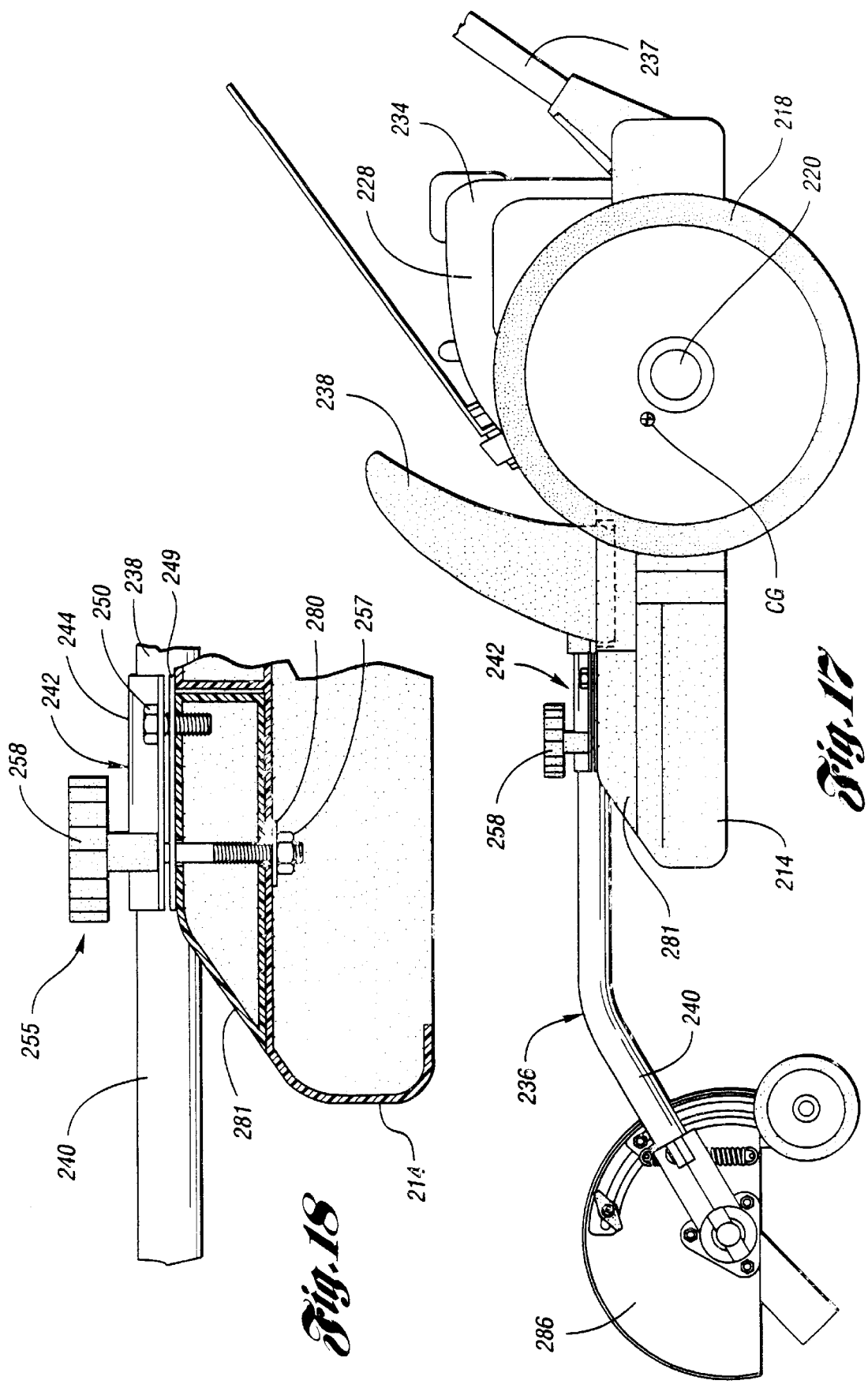

WHEELED LAWN CARE UNIT

TECHNICAL FIELD

This invention relates to a wheeled lawn care system adapted to receive a variety of lawn tool attachments including a line trimmer, a blower, an edger, a cultivator, a snow thrower, etc.

BACKGROUND ART

Home lawn care equipment takes a variety of forms which are well known in the art. These include such tools as line trimmers, blowers, edgers, cultivators, snow throwers and the like. Wheeled units for individual tools are available and many of these systems work efficiently and provide the desired result of cutting, trimming, blower, etc. However, it is often inefficient to maintain such a wide variety of tools. For hand-held devices, this problem has been addressed by patents such as U.S. Pat. No. 5,802,724, which discloses couplings for split-boom power tool with a wide range of selective attachments. Attempts to develop inexpensive wheeled units allowing for selective substitution of a wide range of lawn tools has not been as successful. Units have been developed but these are often difficult to use, provide for limited selection of tools that may be attached and/or have other disadvantages that prevent their wide adoption. Thus, it is desirable to develop a system which is adaptable to selectively achieve all of these results while remaining compact, lightweight and easy to use.

DISCLOSURE OF INVENTION

The present invention is a wheeled lawn care unit which comprises a wheeled carriage with a power source pivotally connected to the carriage about a generally vertical axis to allow selective rotation in a substantially horizontal plane. The unit includes a plurality of tools which may be alternatively selected as the working tool. A tool boom portion of the selected tool is connected for selective angular relationship to a boom portion joined to the power source which is maintained in a substantially horizontal orientation. The power source and tool turn on the pivot axis and may be locked at a selected angular relationship to the carriage.

The power source is positioned on the carriage so that the unit's center of gravity is within a cylinder defined by the wheels of the carriage and forward of the wheels' axis. The pivot axis of the tool is positioned within the power source footprint and preferably within the wheel cylinder also.

A tool that may be part of the unit is a wheeled edger having an edging blade that is rotated in a substantially vertical plane. The edger wheel has a non-working position where the bottom of the edger wheel and bottom of the carriage wheels define a substantially horizontal planar surface that is below the blade and a work position where the bottom of the edger wheel and bottom of the carriage wheels define a substantially horizontal plane to which the blade passes. The edger has a bias that urges the wheel towards the non-working position but which may be overcome to move the wheel to its work position by rocking the handle forwardly.

Accordingly, it is an object of the present invention to provide a wheel lawn care unit that allows for selection of a working tool from a plurality of tools that may be used and for the positioning of the tool at a variety of positions through selective angular adjustments between boom portions and between the power source and carriage.

Another object of the present invention is to provide a wheeled lawn care unit with a low center of gravity and a pivot for the power source which lies within its footprint.

Still another object of the present invention is to provide a wheeled lawn care unit with an edger that may be rocked between a working and non-working position.

These and other objects, features, and advantages of the present invention are readily apparent from the following detailed description of the best mode for carrying out the invention when taken in conjunction with the accompanying drawings.

BRIEF DESCRIPTION OF DRAWINGS

FIG. 9 is a front view of the blower showing, in phantom outline, the blower rotated about the boom axis.

FIG. 10 is a plan view of the embodiment of the present invention of FIG. 1 including a line trimmer and, in phantom outline, showing the line trimmer transversely angularly displaced.

FIG. 11 is a side view of the embodiment the present invention of FIG. 1 including the edger showing it in a working position and, in phantom outline, in a non-working position.

FIG. 17 is a side view of the embodiment of the present invention of FIG. 16.

FIG. 18 is an enlarged section of the handle region.

BEST MODE FOR CARRYING OUT THE INVENTION

Figure 1:
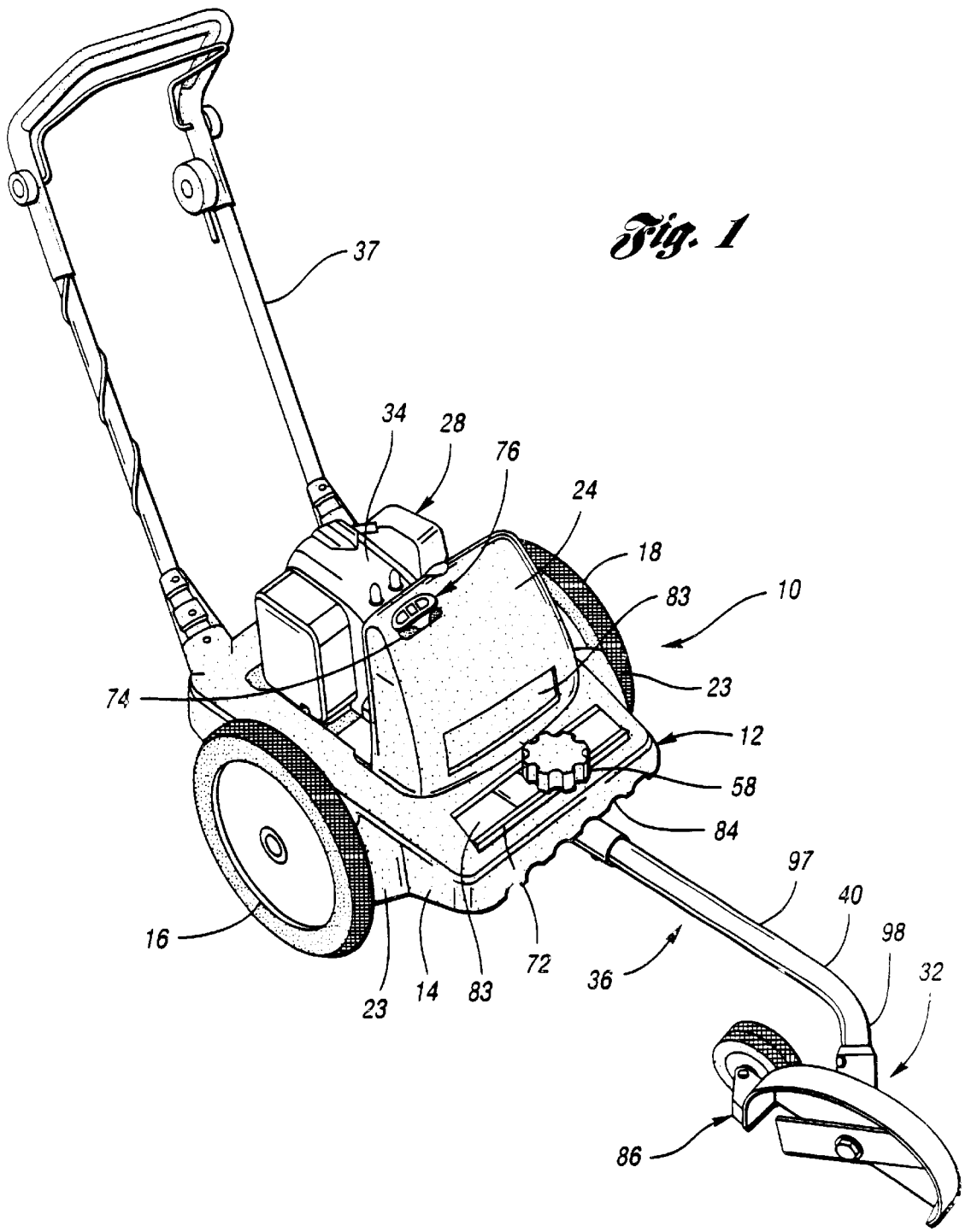
FIG. 1 is a perspective view of an embodiment of the lawn care unit of the present invention showing an edger attached.
Figure 2:
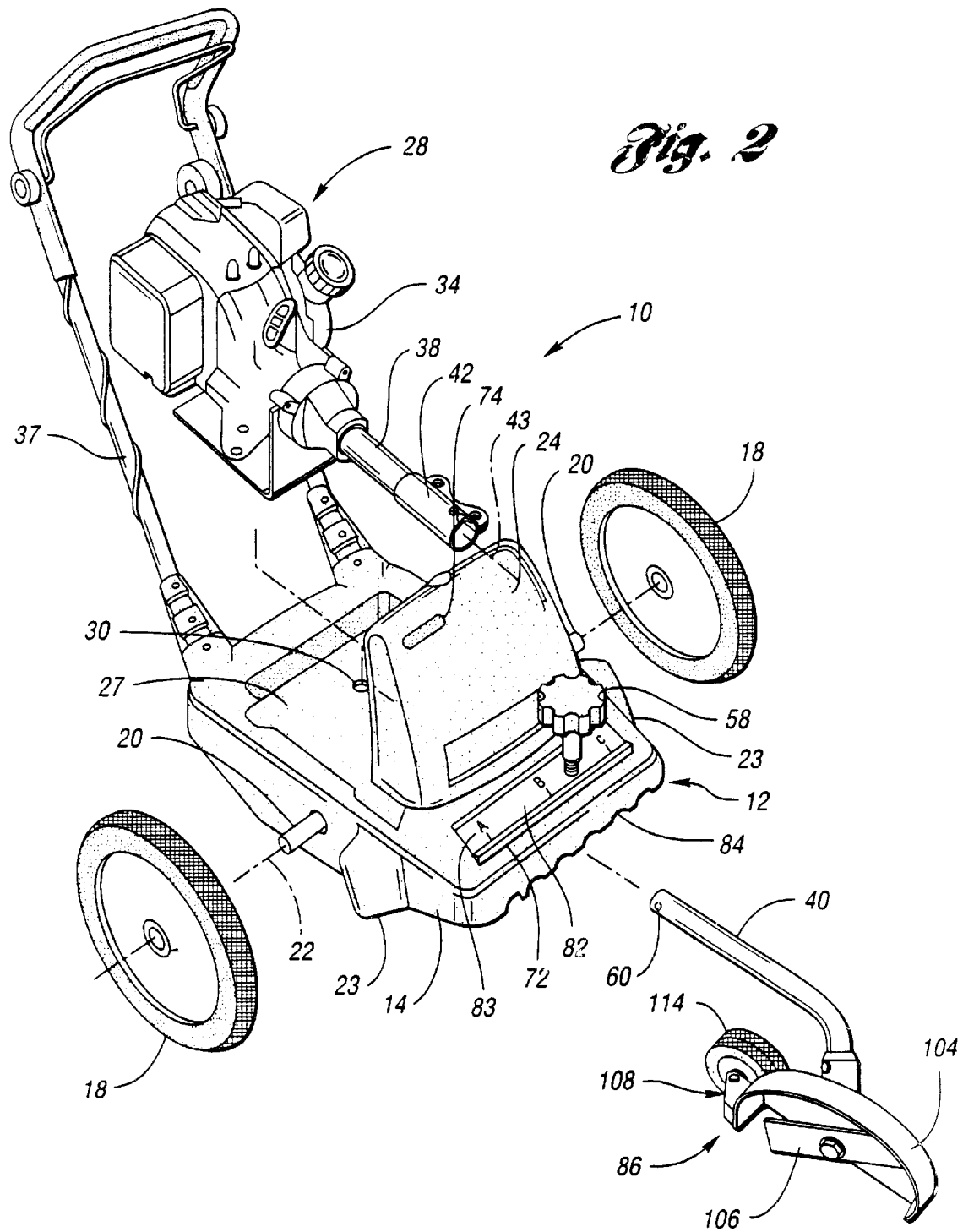
FIG. 2 is an exploded view of the unit of FIG. 1.
Figure 3:
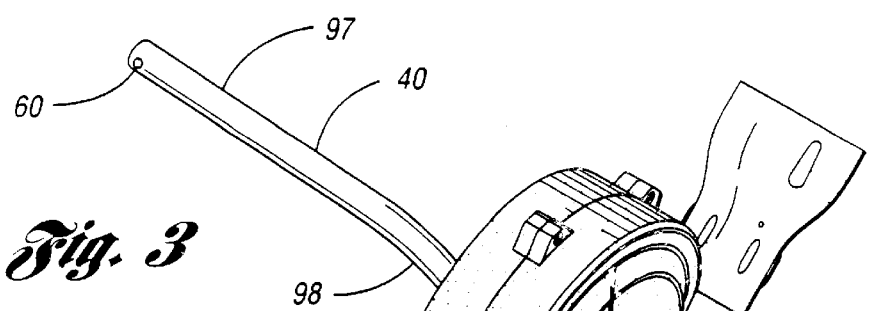
FIG. 3 is a perspective view of a blower tool according to the present invention.
Figure 4:
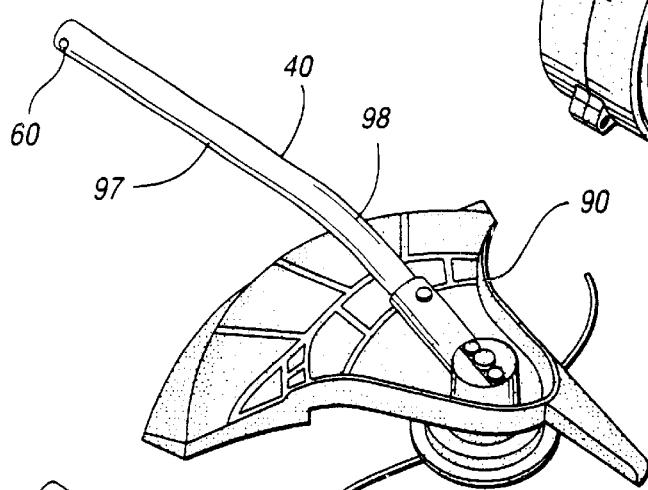
FIG. 4 is a perspective view of a line trimmer according to the present invention.

Referring to FIGS. 1 and 2, the wheeled lawn care unit 10 is shown according to the present invention. The lawn care unit has a carriage 12, including body 14, and a pair of relatively large wheels 16, 18. The wheels are attached to the body by stub axles 20 and have a substantially horizontal common axis 22. To protect the wheels, side guards 23 extend from the side of the carriage forwardly of the wheels. The carriage also has shield 24 placed forwardly of recess 27 in body 14. The recess is for placement of power source 28. The power source is allowed to selectively rotate in a substantially horizontal plane about which has generally vertical pivot axis 30 of the power source pivot 31. Forwardly from the carriage is tool 32. The tool is connected to motor housing 34 by boom 36. Extending rearwardly and upwardly from the carriage is handle 37 with appropriate control devices on the handle, in a manner common to lawn mower and other lawn tools, to allow the operator convenient control of the unit during operation.

Power source 28 provides the power to drive the unit's tools, which will be described later. It may be in the form of a gas-powered motor or an electric motor. In the preferred embodiments, it is in the form of a four-cycle gas-powered motor. Alternatively, it might be in the form of batteries for providing power to electric motors in the individual tools.

As shown in FIG. 2, boom 36 includes motor portion 38 joined to motor housing 34 and extending forwardly and substantially horizontally from the housing. The boom also includes boom tool portion 40 joined to the tool.

Figure 13:
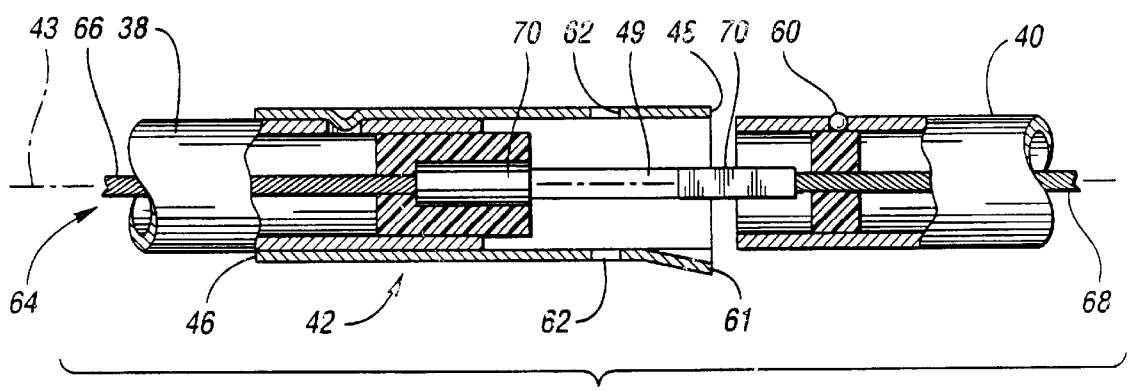
FIG. 13 is a side partially cut-away view of a portion of the coupling of the embodiment of FIG. 1.
Figure 15:
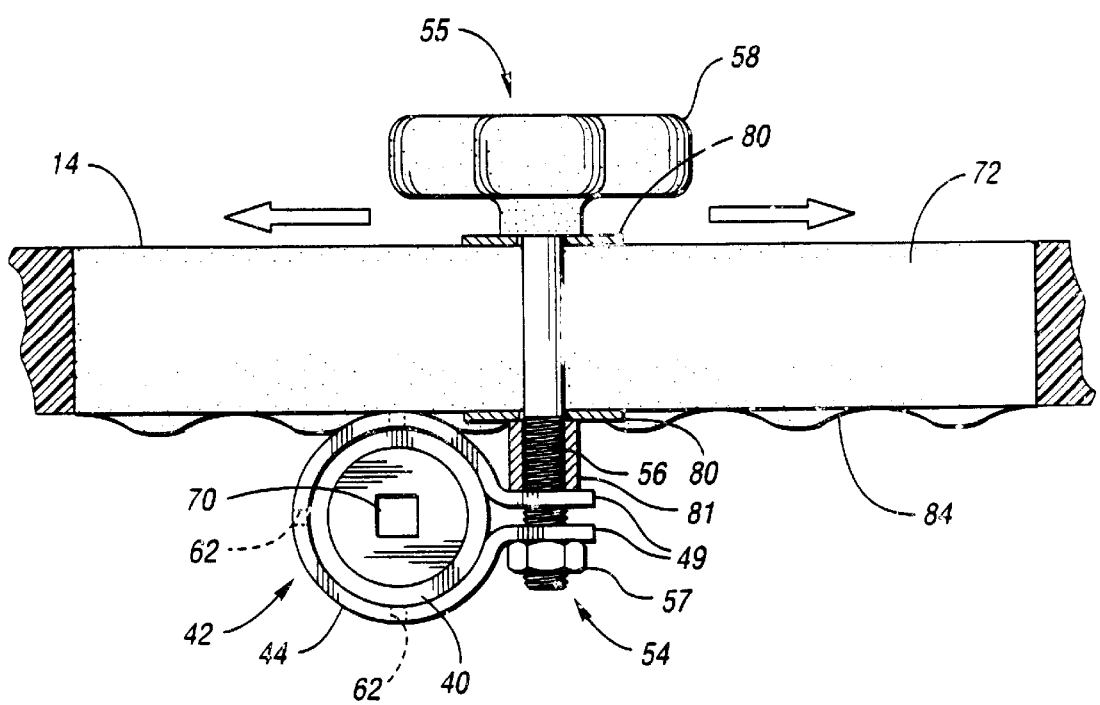
FIG. 15 is a bottom view of the carriage of the embodiment of FIG. 1.

Boom connector 42 shown in FIGS. 2, 13 and 15 joins two boom portions while allowing them to be rotated relative to one another about the longitudinal boom axis 43 of the boom motor portion. Connector 42 includes a substantially cylindrical single piece joint 44 having first and second ends 46 and 48. Joint 44 is configured to form a compressible gap between flanges 49 that extend from the joint. First tightening member is provided in cooperation with the flanges for selectively decreasing the cylindrical diameter of the joint at first end 46 of the joint while squeezing the joint 44 against boom motor portion 38 to rigidly secure the motor portion of the boom within the joint. In this embodiment as shown in FIG. 2, first tightening member 50 includes a screw and nut (not shown) to squeeze the flanges together. Second end 48 of the joint is designed for releasably securing boom tool portion 40 within the connector. This is achieved through second tightening member 54 which cooperates with the flanges for selectively decreasing the cylindrically diameter of the joint at second end 48 for squeezing the joint against boom tool portion 40 to reasonably secure the boom tool portion within the joint. The second tightening member takes the form of a bolt 56 and corresponding nut 57. Knob 58 is attached to the bolt for ease of tightening and for positioning the boom transversely as will be explained below.

Each tool boom portion further includes a resiliently biased locating pin 60 which has been loaded outward by a biasing mechanism. A chamfered lead edge portion 61 is formed along the second end of the joint to facilitate insertion of the locating pin into the joint so it may selectively located in aperture 62 in the joint. Additional apertures are provided on the joint so that the boom tool portion may be rotated within the joint around the axis of the boom. The placement of the pin in an aperture also acts to help maintain the boom tool portion in the connector prior to tightening.

The power source is operably joined to the tool so to drive the tool by power transmission device 64. Power transmission devices are well known in the art, such as wiring for electrically driven tools or a drive shaft in mechanically driven tools. The transmission device extends through the boom. The preferred embodiment takes mechanical power from motor 28 to the tool through a transmission device in the form of drive shaft 64, which is shown in FIG. 13.

Drive shaft 64 is divided into drive shaft motor portion 66 and drive shaft tool portion 68 corresponding to the respective boom portions. Drive shaft portions are operably connected at the boon connector by suitable power transmission connectors 70 at the mating ends of the drive shaft portions. The motor thus provides power to the drive shaft motor portion which is transmitted through the power transmission connector then to the drive shaft tool portion and in turn to the tool. The details of boom connector 42 and power transmission 64, which with alternatives, are disclosed in U.S. Pat. No. 5,802,724, which is incorporated by reference.

Carriage shield 24 serves several purposes. As best shown in FIGS. 10 and 11, it provides some protection to power source 28 and to a lesser extent the operator from rearwardly thrown debris from tool 32. Shield 24 also can provide for pull-string eyelet 74 when using a motor with a forwardly positioned pull-string starter When pull-string starter 76 is placed in a forward position on the motor, it is desirable to have the string spaced from the motor when pulled by the operator while holding handle 37. In the preferred embodiment, this is achieved by threading pull string 78 of the starter through eyelet 74. This allows the operator to start the motor while holding the handle with the string free of the power source.

The unit also allows transverse movement of boom 36 to angularly position the selected tool relative to pivot 30 as shown in FIG. 10. Carriage body 14 extends above the boom and includes transversely extending slot 72. The slot interacts with a boom positioning device 55 to allow yet restrict transverse angular movement of the boom with respect to pivot 30.

In this embodiment, as shown in FIG. 15, boom positioning device 55 includes bolt 56 and knob 58 of connector 42. To maintain and lock the boom in a desired angular relationship, knob 58 is placed above the slot with bolt 56 extending through slot 72 into joint 44 as described above. Suitable spacers, in the form of washers 80, are placed around the bolt on each side of body 14 of sufficient width to bridge slot 72. An additional spacer 81 may be placed around the bolt above joint flange 49 for proper positioning of connector 42 below body 14.

When knob 58 is tightened nut 57 is pulled toward the knob by bolt 56. This both tightens the joint to hold the tool portion of the boom in place and draws spacers 80 together against the carriage body 14 to fix the boom in the desired transverse position. When the knob is loosed the bolt can move within the slot to allow for selection of the desired position. The width of the slot defines the maximum amount of transverse movement allowed. Angular displacement should be such as to allow the tool at its extreme portions to extend beyond the wheels. The slot may allow as much as 45° of movement, although preferably the range is 30°.

To aid the operator in selecting the appropriate angular relationship, indicators 82 shown in FIG. 2 may be placed on the forward portion of shield 24 or body 14 suggestive proper tool placement. These indicators may be placed on of sticker 82, with written instructions such as "trimmer left position" or "trimmer right position", symbols and/or angular descriptions. Alternatively, the indicators may take the form of a series of stays 84 or other physical restraints placed along either slot 72 and/or to aid proper angular placement.

By providing a control mechanism operated by knob 58 to control both the longitudinal rotation of the boom elements and the angular transverse relationship of the boom, efficiency and ease of use is increased. It is envisioned however that on some applications, separate controls for the transverse angular relationship in the longitudinal rotational relationship may be appropriate. Thus, for example, the connector may be placed forwardly of the slot and a separate boom positioning device be used to control the transverse angular positioning of the boom.

Figure 14:
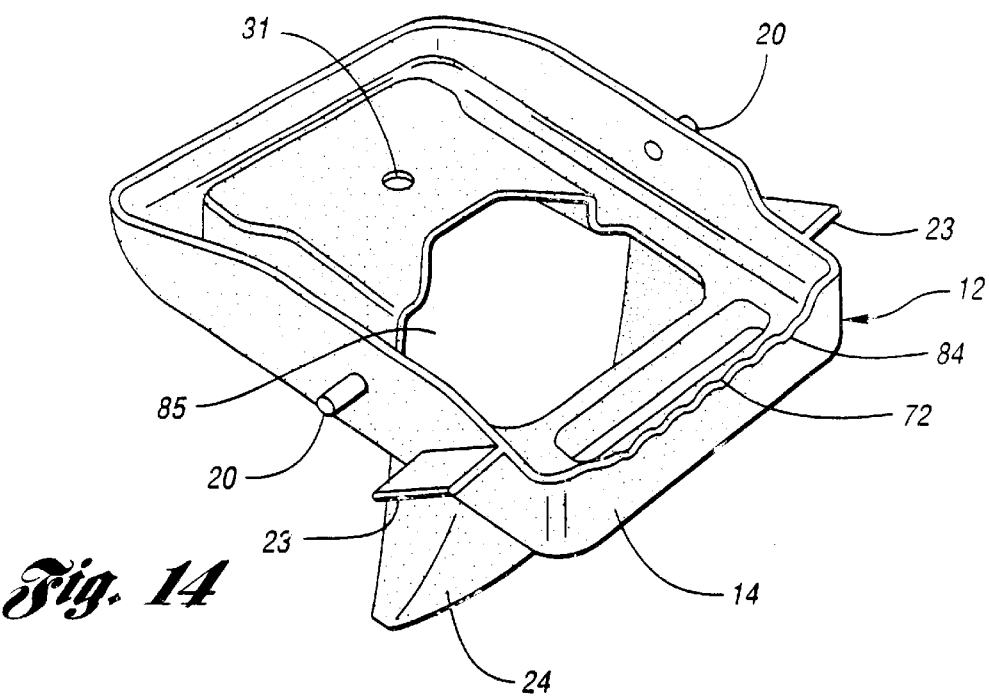
FIG. 14 is a partial front view of the shield, boom and coupling of the embodiment of FIG. 1.

Carriage 12 is preferably of foam unibody construction. The carriage includes a opening 85 below shield 24 and forwardly of recess 26 shown in FIG. 14. The unibody construction allows for ease of manufacture and assembly.

Once motor housing 34 and boom motor portion 38 are connected, they can as a unit be positioned in carriage 12. The motor is positioned over the carriage with the boom motor portion in opening 85. The motor is then lowered onto pivot 30 with the boom motor portion moved upwardly against the lower portion of carriage body 14 with boom positioning device 55 acting to prevent separation of the boom from the carriage.

Figure 8:
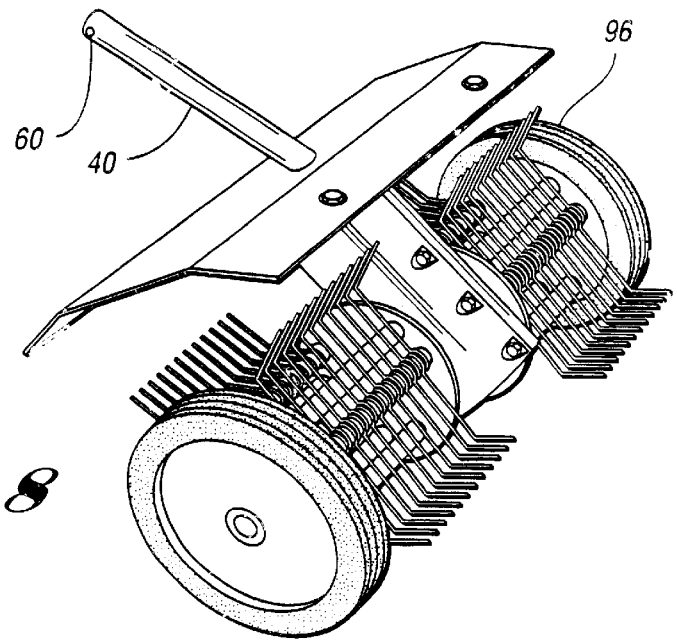
FIG. 8 is a perspective view of a dethatcher according to the present invention

By using a split boom and appropriate connector, the operating tool on the wheeled lawn care unit may be easily changed and positioned. Thus, numerous lawn care tools may be alternatively attached, examples of which are shown in FIGS. 2–7. This include edger 86, shown in FIG. 2; blower 88, shown in FIG. 3; line trimmer 90, shown in FIG. 4; sickle bar 92, shown in FIG. 5; cultivator 94, shown in FIG. 6; snow thrower 95, shown in FIG. 7 and dethatcher 96, shown in FIG. 8. It is envisioned a wide range of lawn care tools may be attached, of which these are examples. The specific designs of the tools is generally well known in the art. Examples of a blower, snow thrower and trimmer suitable for use with the wheeled lawn care unit are disclosed in U.S. Pat. Nos. 5,768,749; 5,603,173 and 5,802,724, both of which are incorporated by reference.

As shown in FIG. 11, the motor portion of the boom extends substantially horizontally forwardly from the power source, so to allow the carriage and power source to maintain a low profile. To position the tool in a proper working relationship, it would normally be necessary to bend each boom tool portion 40 downwardly with a bend appropriate for the given tool. Thus, most boom tool portions will have a first substantially horizontal section 97 extending from boom connector 42 and a downward section 98 at the tool, as shown in FIGS. 2 through 7. The use of a flexible drive shaft allows this to be accomplished without special design of the drive shaft for each application.

Figure 5:
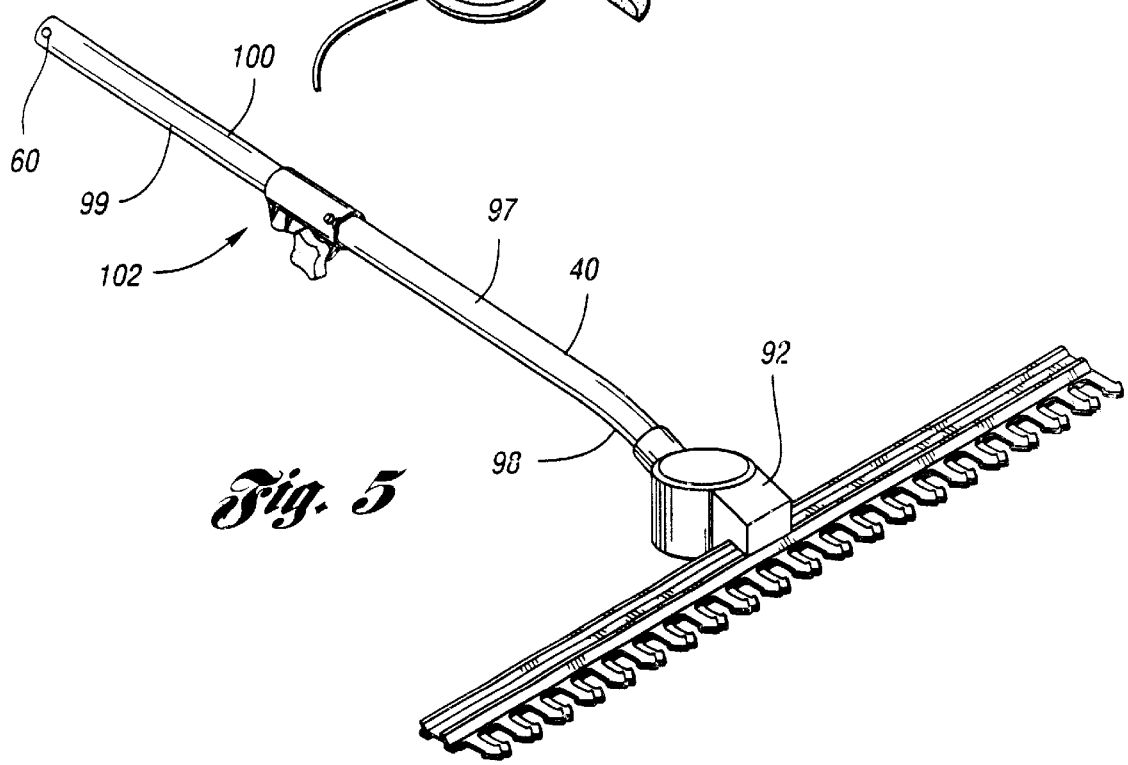
FIG. 5 is a perspective view of a sickle bar according to the present invention.
Figure 6:
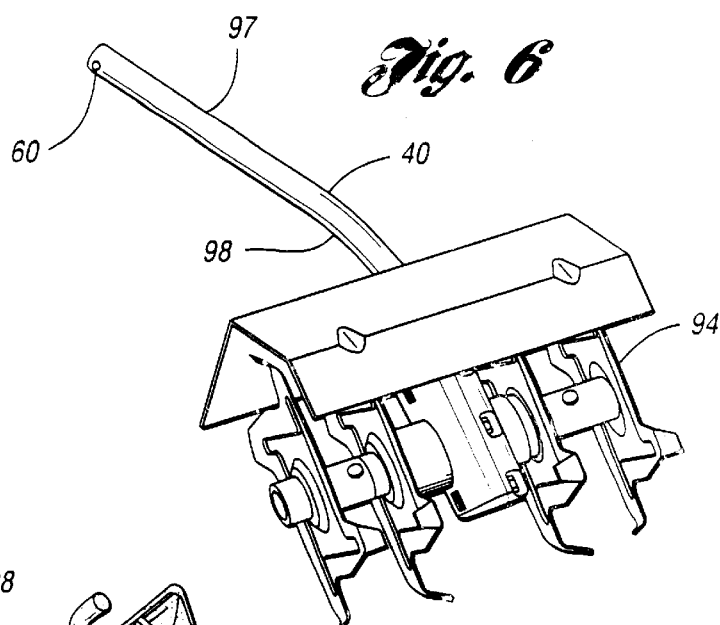
FIG. 6 is a perspective view of a cultivator according to the present invention.
Figure 7:
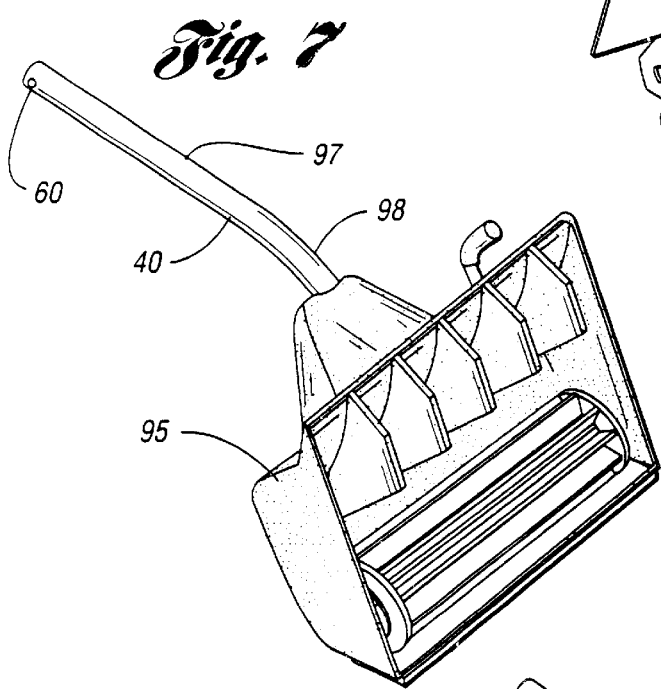
FIG. 7 is a perspective view of a snow thrower according to the present invention.

It may also be desired to extend the length of the boom so that the tool is positioned at a further distant from the carriage. In such a case as shown in FIG. 5, one or more extensions 99 may be used, each including boom extension portion 100 enclosing a corresponding drive shaft extension portion (not shown). Each extension will be used with a boom connector 102, and have a power transmission connector (not shown), corresponding to boom connector 42 and power transmission connector 70. Use of the extension allows the tool to be used in a wider range of areas since it may be difficult to wheel the unit into all portions of the work area. While extensions may be curved for special purposes, it is preferable that they are straight and maintained in a horizontal position aligned with the boom motor portion so that the longitudinal boon axis is maintained.

FIG. 9 shows how the tool can be rotated around the longitudinal axis to provide use of the tool, in this case a blower, with output in opposite directions. Blower 88 is positioned to direct airflow to the right as shown by arrow 89 in FIG. 9 by attaching the blower's boom tool portion 40 in boom connector 42 at an appropriate position and tightening knob 58. If it is desired to direct airflow in the opposite direction, it is simply a matter of loosening knob 58 and rotating blower 88 to the new desired position as shown in phantom outline in FIG. 9 providing air flow to the left as represented by arrow 89'.

FIG. 10 is a top view of the wheeled lawn care unit showing how the tool, in this case, a line trimmer 90 can be positioned at different transverse angular relationships so to allow the line to extend beyond either the left or right wheel. Pivot 30 for the tool preferably lies within footprint 93 of the power source. Footprint 93 is defined by a circle enclosing the perimeter 91 of motor housing 34 when viewed from above. This allows the lawn care unit, particularly the carriage and wheels to have a narrow width so to allow the unit to be moved to otherwise inaccessible areas.

To allow ease of movement and greater control of the unit, it is desired that lawn care unit 10 be compact with a low center of gravity CG. The center of gravity CG of the unit should be as near as possible to carriage wheel axis 22 while remaining forward of the wheel axis. The center of gravity CG should preferably not be higher than the diameter D of the carriage wheel and no more forward of the radius R of the wheel from wheel axis 22, as shown in FIG. 11. Carriage wheels 16,18 share an effective axis 22 whether a single axle is used or a pair per each wheel. There is an area extending between the wheels defining a wheel cylinder having wheel axis 22 as its axis and an outer perimeter corresponding to radius R of the wheels. The preferred location of the center of gravity CG is within in the forward half of the wheel cylinder, e.g., forward of a vertical plane passing through axis 22 and between the wheels themselves. For greater ease of movement the center of gravity should be no more than two inches from the wheel axis. Placement of the center of gravity in this manner allows for greater control of lawn care units by the operator. Due to the close placement of the center of gravity to the wheel axis, when the tool is removed from the lawn care unit, the effective center of gravity of the remaining components of the unit will be shifted rearwardly of the carriage wheel axis 22 to cause the remaining components of the unit, unless constrained by the operator, to rotate rearwardly so to rest on carriage wheels 16, 18 and handle 37. This has the benefit of allowing easy access to connector 42 during changing of tools.

To help ensure proper placement of the center of gravity, it is preferred that the power source 28 be placed between to the wheels in close proximity to wheel axis 22 since power source will normally be a major contributor to the center of gravity. Placement of pivot 30 within the wheel cylinder further aids in creating a compact unit.

Figure 12:
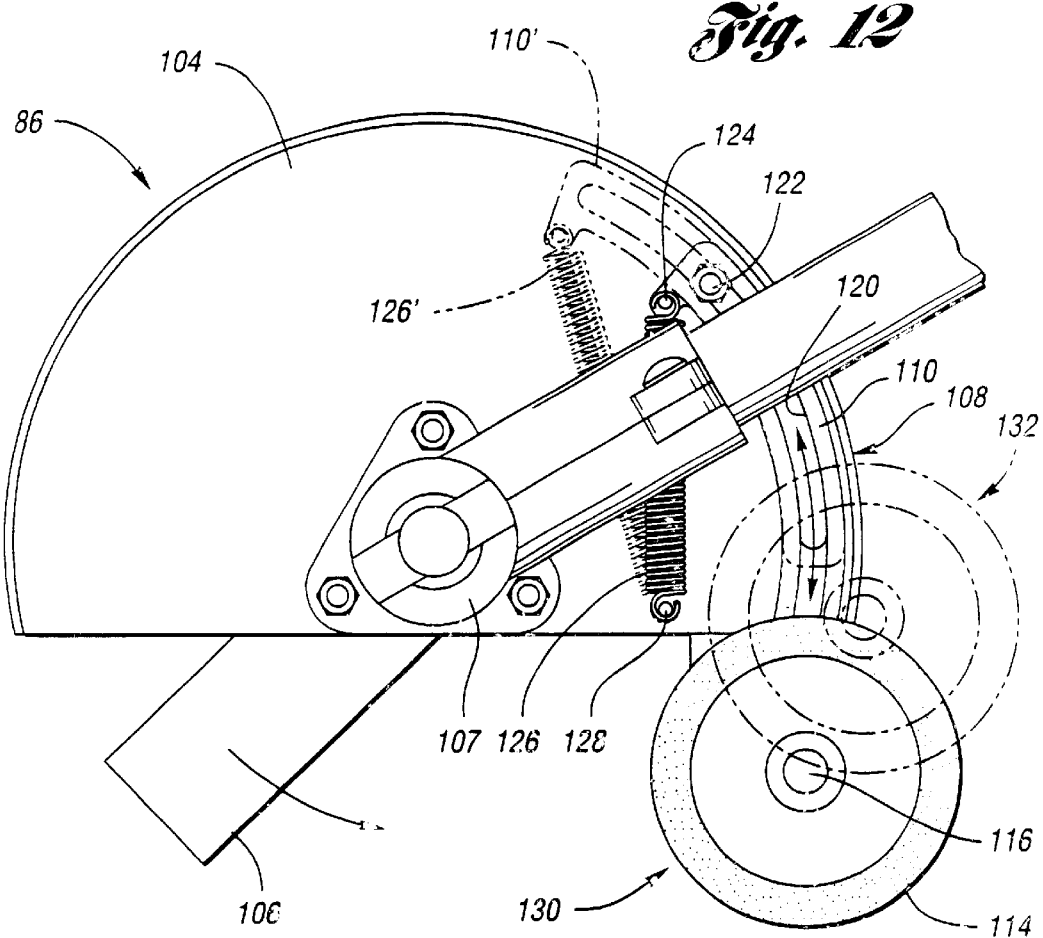
FIG. 12 is a side view of the edger in the working position and, in phantom outline, in the non-working position.

Although it is envisioned that many existing tools may be adapted for use with the unit, edger 86 is particularly suited for use with the wheeled lawn care unit. As shown in FIGS. 2, 11 and 12, edger 86 includes edger shield 104 and edger blade 106, which is driven by in a manner known to the art, such as by gear box 107. The edge blade will rotate in a substantially vertical plane. Attached to the shield is wheel assembly 108. The wheel assembly includes wheel bracket 110 and edger wheel 114, which is attached to wheel bracket 110 by axle 116.

Extending upwardly along wheel bracket 110 is arcuate slot 120. A pin in the form of bolt 122 is joined to the back of edger shield 104 and passes through slot 120 so to allow movement of the wheel bracket on pin 122. A second pin in the form of bolt 124 is joined to the upper end of bracket 110. Also joined to the second pin by coiled compression spring 126, the other end of which is fixed to the edger shield at third pin 128. Spring 126 acts to bias the wheel assembly downward so that the wheel is normally extended to a lowered non-cutting position. The edger wheel and carriage wheels define a plane 129 corresponding to the surface upon which they travel, such as a sidewalk, as shown in FIG. 11. When edger wheel 114 is in the lower position 130, the trimmer blade to be raised above the flat surface to a distance greater than the blade radius thereby providing a clearance between the surface and blade. This prevents contact of the blade and surface. When the blade is properly positioned above the area to be edged, the operator can then by pushing or rocking the handle forward pivot the lawn care unit on the carriage wheels. This which will create a force on the edger wheel so to overcome the spring strength. The wheel assembly then moves along the slot to raise the edger wheel to a raised work position 132 and effectively lowers the edger into a work position, with the blade below plane 129 defined by the edger wheel and the carriage wheels.

Figure 16:
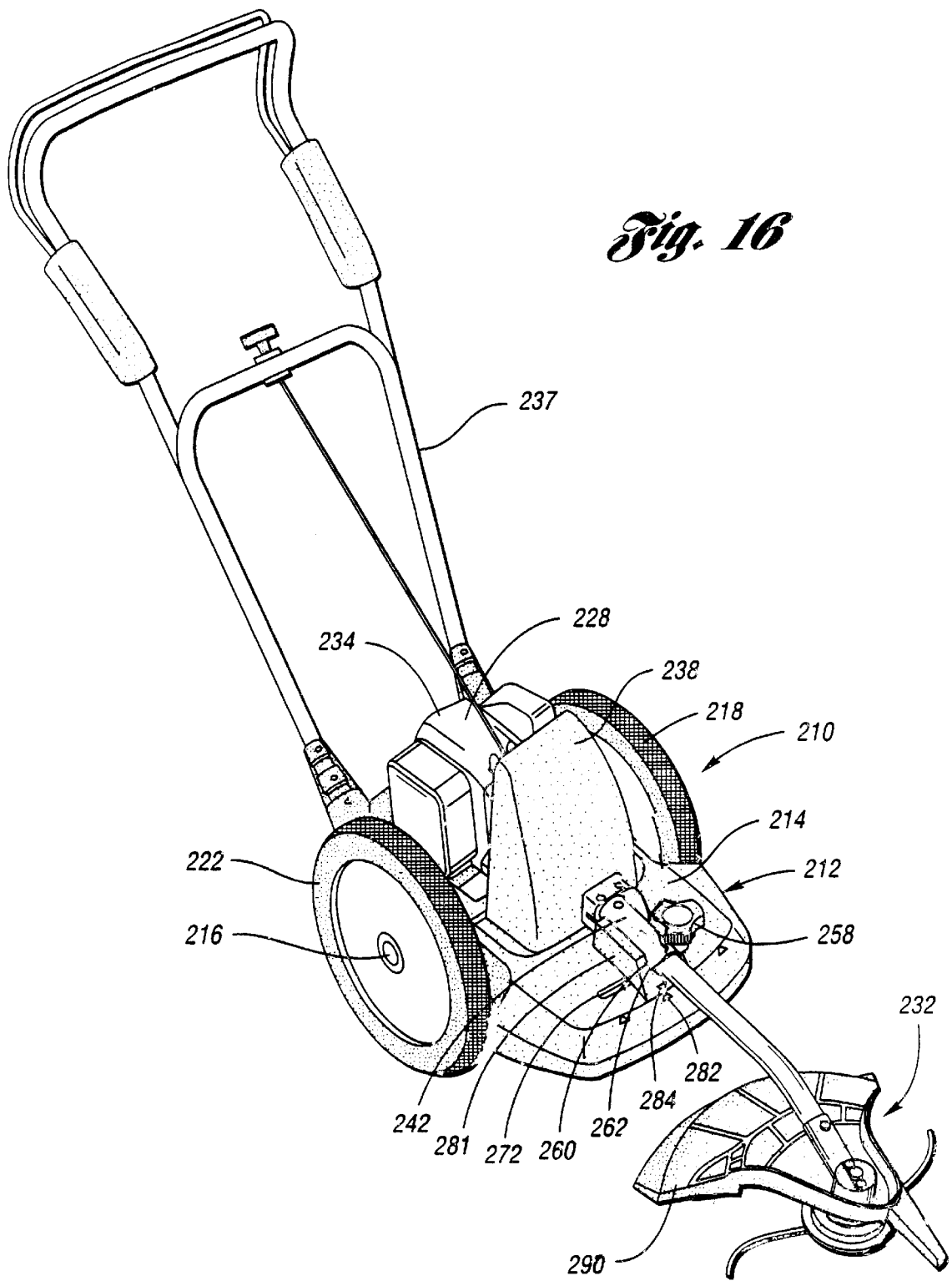
FIG. 16 is a perspective view of the embodiment of the lawn care unit of the present invention showing a line trimmer attached.

A second embodiment of the lawn care unit is shown in FIGS. 16–18. Many of the elements of this embodiment correspond to those of the first embodiment shown in FIG. 1. The lawn care unit 210 has a carriage 212, including body 214, and a pair of relatively large wheels 216, 218. The wheels have a substantially horizontal axis 222. Handle 237 extends upwardly and rearwardly from the carriage body. The second embodiment places boom 236 entirely above carriage body 214. Shield 238 is moved rearwardly to abut the housing 234 of power source 228. Shield 238 is attached to boom 236 rather than to carriage body 214. Boom 236, power source 228, shield 238 and tool 232 share common pivot axis on carriage body 214 beneath the power source housing 234. This allows for use of a smaller shield since shield 238 will always be maintained between the power source and the tool. In FIG. 16, tool 232 takes the form of line trimmer 290. Other tools can be interchanged by use of connector 242. For example, edger 286 is shown as the operating tool in FIG. 17.

Placement of shield 238 next to the power source allows for connector 242 to be positioned slightly forwardly of the shield yet still in cooperation with carriage body 214. Positioning support 281 spans the space between connector 242 and the carriage body 214 to support the boom, to aid in controlling of the angular displacement of the boom and to provide a surface for a tool angular displacement indicator 284, which in this embodiment takes the form of a pointer or arrow. Knob 258 controls the tightening of joint 244 around the boom tool portion. Knob 258 is also part of boom positioning device 255 for transverse control of boom 236 along slot 272.

With knob 258 loosened, the selected tool boom tool portion 244 is positioned within connector 242 and held in a position determined by placement of locating pin 260 in a selected aperture 262. The tool may be then transversely located for use of indicators 282 on carrier body 214 with indicia at predetermined locations suggesting optimal angular positions. A pointer 284 is positioned on support 281 to aid the operator in correctly positioning the tool. With knob 258 remaining untightened, the tool is rotated on pivot 230 until pointer 284 is positioned above the desired indicia 282. Knob 258 is then turned so to tighten bolt 257 causing support 281 and washer 280 to be pressed together against carriage body 214 so to hold boom 236 at the desired angular position. Tightening also causes joint flange portions 249 to be drawn together capturing the boom tool portion 240 within joint 244. The boom motor portion 238 is joined to connector 242 by a first tightening member 250 which draws the flanges 249 together over the boom motor portion.

In this embodiment also the pivot for the tool also lies under the power source 228 withing the footprint of power source housing. Placement of shield 238 closer to power source 228 adds to the compactness of the unit. The center of gravity CG of the unit in this embodiment again lies just forward of wheel axis 222 and within the wheel cylinder.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A wheeled lawn care unit comprising:
   a wheeled carriage,
   a power source pivotably and directly mounted to the carriage about a generally vertical axis to allow selective rotation in a substantially horizontal plane,
   a plurality of tools, each of which may be alternatively selected to be joined to the power source so to be the working tool for the unit, each tool joined to a tool boom portion,
   a power source boom portion, which is rigidly joined to the power source so to be maintained in a substantially horizontal orientation and to move with the power source about the vertical axis, and
   a connector allowing selective joinder of the power source boom portion to a tool boom portion of a selected tool at selective rotational angular relationships between the portions.

2. The lawn care unit of claim 1, further comprising a locking device for holding the power source at a selected transverse angular relationship to the carriage.

3. The lawn care unit of claim 2, further comprising a single control mechanism for the locking device and the connector where the locking device and connector are jointly controlled by the control mechanism.

4. The lawn care unit of claim 3, where the control mechanism includes a support that spans the space between the connector and the carriage and moves with the booms about the pivot and indicators on the support and carriage that provide for alignment of the booms at predetermined positions relative to the vertical axis.

5. The lawn care unit of claim 1, where the wheeled carriage has a pair of wheels and the center of gravity of the unit lies within a cylinder defined by the wheels.

6. A wheeled lawn care unit having a center of gravity for use on a surface comprising:
   a power source having a footprint,
   a carriage having a front end, a pair of wheels having a common wheel axis and a substantially vertical pivot for the power source positioned within power source footprint,
   a tool positioned forwardly of the front end of the carriage which turns with the power source on the pivot, and
   a center of gravity of the unit within a cylinder defined by the wheels and forwardly of the wheel axis.

7. The lawn care unit of claim 6, where the center of gravity lies within two inches of the wheel axis.

8. The lawn care unit of claim 6, where the pivot lies within the wheel cylinder.

9. A wheeled lawn care unit comprising:
   a carriage having a front end, wheels and a substantially vertical pivot.
   a power source having a circular footprint defined by the outer perimeter of the power source when viewed from above,
   a tool positioned forwardly of the front end of the carriage and joined to the power source,
   where the tool turns on the axis which lies within the footprint of the power source.

10. The lawn care unit of claim 9, further comprising a boom connecting the tool to the power source and the tool, power source and boom turn together on the pivot as a unit.

11. The lawn care unit of claim 9, further comprising a shield which lies between the power source and the tool and overlies the boom.

12. The lawn care unit of claim 11, where the shield is connected to the boom and pivots therewith.

13. The lawn care unit of claim 9, where the power source has a side profile and the wheels have a common side profile and a common axis and the unit has a center of gravity that lies within the side profiles of the power source and wheels forwardly of the wheel axis.

* * * * *